Patented June 20, 1939

2,163,331

UNITED STATES PATENT OFFICE 2,163,331

METHOD OF DRYING MILK WHEY

John R. Spellacy, Burlingame, Calif., assignor to Hercules Powder Company, Wilmington, Del., a corporation of Delaware No Drawing. Application October 26, 1937, Serial No. 171,133

7 Claims. (Cl. 99—57)

This invention relates broadly to improvements in methods of drying milk whey, by forming the whey into thin layers and drying in that form, and more particularly to a process of adding dry milk powder to milk whey to produce a whey composition having a reduced content of water, and then drying the thickened composition so produced.

Heretofore, many attempts have been made to dry milk whey, for example, by spray drying, etc. An important disadvantage of spray drying whey is the high cost of the spray drying equipment. Another process used heretofore is the heated drum process, which also suffers from the disadvantage of high cost of equipment in relation to the output, and high cost of steam, due to the high water content of the whey fed to such operation.

The object of this invention is to provide a simplified and economical process for drying whey, which may be accomplished by the use of known apparatus, of relatively low cost, not requiring as large a volume of steam in its operation as do the spray drying and heated drum processes.

When whey is dried on drum driers, the absence of the protein or casein in the whey leaves a balance of solids which is incapable of holding the whey on the drum surface, except as an extremely thin layer. Dried whey comprises, practically speaking, mainly lactose, and, as such, contains nothing of a sufficiently coherent or cohesive nature to form on the drier rolls a sheet of substantial thickness.

Furthermore, on drying whey on drum driers, the heat from the drums has a tendency to caramelize the lactose, to form a somewhat sticky mass, which, instead of being easily removed from the drums by scraper knives, "rolls up" on the edges of the knives and finally drops off in a somewhat gummy state. This gummy mass, when reaching the conveyers, clogs the latter and often stops them, requiring stopping and cleaning.

Liquid skim milk or liquid buttermilk may be mixed with whey, in order to incorporate sufficient protein (contained in the liquid skim milk or liquid buttermilk) to form a sheet of dried whey of substantial thickness and cohesiveness when dried on drum driers, but such is impractical on account of the consequent addition of more water (from the skim milk or buttermilk) to the already very dilute whey. Whey already contains about 95% water, and addition of skim milk or buttermilk, itself containing about 90% of water, further adds to the thin body of whey and increases largely the amount of water to be evaporated.

I have found that, when drying whey at atmospheric pressure on drum driers, at least 70–80% of skim milk or buttermilk must be added to whey, to produce a sheet of dried whey of substantial thickness and cohesiveness, so as to be readily removed in a dry, powdery state from the drums. In the case of drying in vacuo on drum driers, it is necessary to use at least 60% buttermilk or skim milk in the whey to secure equivalent results. The necessity of employing such a large proportion of skim milk or buttermilk also materially reduces the practicability of this process, because of the lack of supply of skim milk or buttermilk under ordinary, operating conditions.

My improved process of producing dried whey consists in adding to the whey a neutralizing agent, such as lime, sodium carbonate, sodium hydroxide, or other known alkali, in quantity just sufficient to neutralize the acid in the whey, and when the whey is completely neutralized, I add dry milk powder to the whey in such proportions as to form with the whey a thickened mass, capable of being applied readily to the drums of a drum drier, and then dry the mass in any suitable manner, for example, on a drum drier, under atmospheric or reduced pressure.

The proportions of dry milk powder added to the whey may be varied, and the larger the amount added, the better the results, but I find that a minimum of 8 lbs. of milk powder to 100 lbs. of whey must be used to obtain satisfactory results. By adding more than 8 lbs. of milk powder per 100 lbs. of whey, the lactose content of the dried whey product is reduced in proportion to the amount of dried milk powder added. However, if desired, there is no practical limit to the amount of dried milk powder which I may add to the whey, as long as too thick a composition is not produced, which cannot readily be handled in feeding to the drier.

By the use of my improved process, it is possible to build up self-sustaining sheets, of appreciable thickness, of the mixture on a drum drier or the like, and the dried sheets may be readily scraped from the drier in the form of a loose, powdery, non-cohesive product. The addition to the whey of dried milk powder (prepared, for example, from buttermilk or skim milk), imparts to the whey composition a sufficiently high protein content to form a sheet, or layer, of the mixture on the drier, of substantial thickness and cohesiveness, capable of being dried completely and readily removed from the drier by scrapers.

As stated, by my improved method it is possible to control the lactose content of the finished product by varying the amount of dried milk powder admixed with the whey before drying. Thus, the finished product may have controlled and desirable characteristics. For example, the product produced in accordance with this invention is practically valuable for feeding poultry, for control of the very serious poultry disease known as coccidiosis.

It is, of course, apparent that this invention may be employed in connection with any form of drier which will pick up the mixture in the form of sheets, of which the roller or drum drier is a good example. Furthermore, it is apparent that the drying operation may be carried out in vacuo or under atmospheric pressure.

The mixture of dried milk powder and whey may be applied to drying drums in any desired manner, for example, by revolving the drums partly submerged in the mixture, by feeding the mixture into the V formed by the drums almost in contact one with the other, in the case of double drum driers, by spraying the mixture on to revolving drums, etc.

By the term dried milk, in the claims, I intend to include either dried skim milk powder or dried buttermilk powder, or mixtures thereof.

The dried product, produced in accordance with my invention, being high in lactose, is slightly susceptible to hardening or caking during storage in the containers. To prevent such hardening, I place the product, after removal from the drier, in a stationary or revolving chamber, through which I pass a current of moist air, thus allowing the dried whey product to absorb moisture. The product, so treated, when packed in containers, has no further tendency to absorb moisture from the air and cake or harden.

If desired, I may also add to the dried whey product about 1% of tricalcium phosphate, to prevent caking or hardening.

What I claim and desire to protect by Letters Patent is:

1. The method of producing dried whey which includes mixing dried milk powder with liquid whey and drying the mixture in the form of a sheet of substantial thickness.

2. The method of producing dried whey which includes mixing not less than 8 pounds of dried milk powder with 100 pounds of liquid whey, and drying the mixture in the form of a sheet of substantial thickness.

3. The method of producing dried whey containing protein, which includes mixing dried milk powder and liquid whey, forming the mixture into self-sustaining sheets of substantial thickness on a moving surface, heating the surface to dry the mixture, and scraping the dried mixture from the surface to form a powdery, non-sticky dried whey.

4. The method of producing dried whey containing protein, which includes neutralizing the acidity of the whey by adding an alkali thereto, mixing not less than 8 pounds of dried milk powder with 100 pounds of liquid whey, forming the mixture into self-sustaining sheets of substantial thickness on a revolving, heated surface, heating the surface to dry the mixture, and scraping the dried mixture from the surface to form a powdery, non-sticky dried whey.

5. The method of producing dried whey containing protein, which includes mixing not less than 8 pounds of dried milk powder with 100 pounds of liquid whey, passing the mixture over heated drying rolls to remove water from the mixture, and removing from the surface of the heated rolls a powdery, non-caking whey containing a high protein content.

6. The method of producing dried whey containing protein, which includes mixing not less than 8 pounds of dried buttermilk powder with 100 pounds of liquid whey, passing the mixture over heated drying rolls to remove water from the mixture, and removing from the surface of the heated drying rolls a powdery, non-caking, dried whey containing a high protein content.

7. The method of producing dried whey containing protein, which includes mixing not less than 8 pounds of dried milk powder with 100 pounds of liquid whey, passing the mixture over heated drying rolls as a self-sustaining sheet of appreciable thickness to remove water from the mixture, and scraping from the surface of the heated drying rolls a powdery, non-caking, dried whey containing a high protein content.

JOHN R. SPELLACY.